ns and the outer face of which constitutes the inner wall of annular flow passage 6. The passage 6 which completely surrounds housing 5, communicates at one end with the delivery side 7 of rotary pump 2 and at the other end with discharge connection 8a. The outer wall of passage 6 consists of casing 8, which is described in detail below.

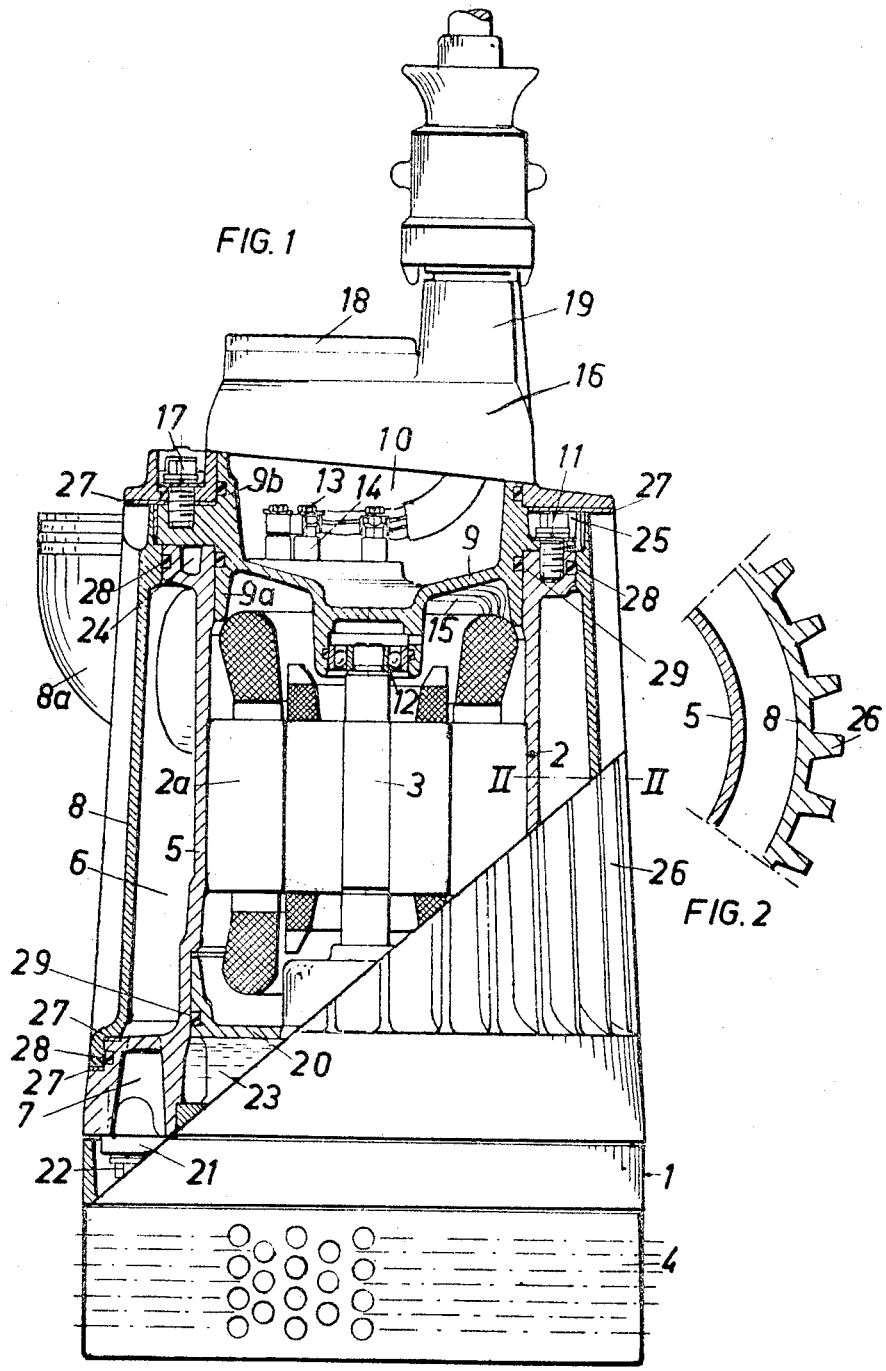

3,272,136
ROTARY PUMP UNIT
Ingmar Franzen, Hannover-Linden, Germany, assignor to Aktiebolaget Flygts Pumpar, Stockholm, Sweden
Filed Apr. 7, 1964, Ser. No. 357,971
Claims priority, application Germany, Apr. 20, 1963, A 42,926
2 Claims. (Cl. 103—87)

The invention relates to a unit comprising a rotary pump and an electric motor, combined within a single casing.

Such units have become known in the form of submerged pumps. In pumps of this kind, the pump rotor is mounted unanchored on the spindle of a vertical motor, which is enclosed in a stator housing sealed-off from the pump chamber. The cable lead-in to the motor also enters the casing through a seal and the pump unit has a bottom strainer, so that it can be immersed in the liquid that is to be pumped. Pumps of this class are very suitable for foundation trenches, but there is a danger of explosion when they are used in trenches and other enclosed spaces and installations exposed to explosion risks.

The main purpose of this invention is therefore to provide a rotary pump unit, driven by an electric motor, which is protected against explosion and accumulation of gas.

To achieve this, the invention proposes that the stator housing of the motor shall be shielded on all sides from its surroundings by pressure-tight sealed chambers. In this way, should the outer casing of the pump unit be fractured, the motor compartment remains protected against commiunication with the outside.

In addition to this, the heat generated in the motor must be very efficiently dissipated, to prevent its overheating. In the invention, this is most effectively done by having the abutting metal surfaces of the stator housing and the outer casing connected with each other by heat-conductive packings such as, for example, "Klingerit" or the like. Contrary to what might be expected, it has been found that this construction produces far more effective heat transmission than direct contact between bare metal surfaces. The primary purpose of these packings is not to form a pressure seal, which is provided by special packing rings, but chiefly to conduct the heat away.

The additional provision of longitudinal ribs on the outer casing of the pump unit increases not only the dissipation of heat from the motor to the surrounding air, but also the ability of the pump unit to withstand impacts.

One embodiment of the invention is described hereunder in detail, by way of example in conjunction with the accompanying drawings, in which:

FIGURE 1 is a side elevation partly in section of a rotary pump conforming to the invention, and FIGURE 2 is a partial sectional plan view, following the line II—II in FIGURE 1.

The embodiment illustrated is a portable submersible pump, consisting of rotary pump 1 and electric motor 2, which are combined to form a unit construction. In this unit, the pump rotor is mounted unanchored on the end of the motor spindle 3 and draws the water that requires pumping through a cup-shaped strainer 4, which serves as a support or stand for the pump unit.

The surround of strainer 4 contains holes, through which the water passes for pumping, whereas the base of the strainer 4 is closed.

Stator 2a of electric motor 2 is fitted inside housing 5 which is substantially cylindrical and is open at both ends and the outer face of which constitutes the inner wall of annular flow passage 6. The passage 6 which completely surrounds housing 5, communicates at one end with the delivery side 7 of rotary pump 2 and at the other end with discharge connection 8a. The outer wall of passage 6 consists of casing 8, which is described in detail below.

The upper end of stator housing 5 is closed with a cover 9, the deep cylindrical guide face of which 9a projects into the upper part of housing 5 and is sealed with a rubber packing such as ring 29, and which is secured to housing 5 by means of screws 11. The underside of cover 9 carries a seating for the top bearing 12 of motor spindle 3. The upper side of the cover is fitted with terminals or the like 13, for the leads 14, to the input connections 15 of the electric motor stator windings.

At its outer rim, cover 9 provides a seating for a cap 16, which is secured with screws 17 to cover 9, cylindrical flange 9b ensuring the existence of the requisite spark gap. Cap 16 should preferably have an inspection door 18, held in place by countersunk screws. Cap 16 is also provided with a sealed cable lead-in 19.

In this way space 10, which lies between cover 9 and cap 16 and contains the electrical connections, in thus pressure-sealed against the motor compartment as well as against the surrounding atmosphere.

The bottom end of stator housing 5 is closed by a partition 20, which is fitted with bearings and packings for motor spindle 3 and, like top cover 9, has a deep cylindrical sealing surface, with rubber packing 29, to ensure the existence of an adequate spark gap. At a certain distance below partition 20, another partition 21 is secured directly to the bottom of housing 5 by means of screws 22. This lower partition 21, which can be made from one piece with springs together with upper partition 20, is also fitted with seals for motor spindle 3, so that a pressure-tight space 23 is formed between partitions 20 and 21. Space 23 is filled with oil for the lubrication of the spindle packings.

At the upper rim of stator housing 5 and round the periphery of cover 9 are annular spaces 24 and 25 respectively.

It will be clear from the foregoing that the space enclosing electric motor 2 is completely surrounded by pressure-sealed spaces or chambers. This affords good protection to the motor compartment, which is thus prevented from being placed in communication with the outside in the event of a fracture occurring in any part of the outer casing.

To give additional protection, the outer casing 5 as already described, is provided with strengthening ribs 26. The ribs 26 act at the same time as fins to increase the cooling surface of casing 8, the interior face of which is in contact with the flow of water. This is particularly important because, as described above, stator housing 5 cannot discharge its heat directly to the outside.

A further point to note is that it is impossible, or at least very difficult, to provide either the top cover 9 or the bottom partitions 20 and 21 with fins for dissipating heat to the outside. To ensure adequate heat dissipation nevertheless, packings 27 made of heat-conductive material such as "Klingerit," or the like and approximately 0.02" to 0.04" in thickness, are inserted between the abutting metal faces of outer casing 8, with its ribs 26 and those of cap 16 (and also cover 9, as the case may be) and of motor housing 5. Contrary to what might have been expected, it has been found that the use of such packing material gives a considerably higher potential heat dissipation than direct contact between bare metal surfaces.

The packings 27 just described thus serve primarily for heat transmission, whereas rubber rings 28 act as pressure seals. The various members assembled parallel to form the casing of the pump unit need not, therefore, be made to extreme tolerances, since packings 27, with their high heat conductivity, allow for some degree of adjustment between the parts.

This mode of assembly ensures that considerable quantities of heat will be conducted away through the metal from motor housing 5 to cooling and reinforcing fins 26 and that the heat dissipation to the external atmosphere will be increased.

What I claim is:

1. In a rotary pump unit having a rotary pump and an electric motor driving said pump, the combination of an inner housing structure having inner and outer peripheral faces and defining on its interior a motor chamber housing said electric motor, an outer casing structure surrounding said housing and having an inner peripheral face defining with said housing an annular conduit for transmitting the pumped fluid, and sealing means for said structures for protection against explosion comprising top and bottom closures having outer peripheral faces and closing said structures and pressure-sealing said chambers, some of the outer faces of said closures engaging inner faces of said housing, and inner faces of said casing engaging outer faces of said housing, said closures having axial surfaces disposed opposite axial surfaces of said structures, elastic rings disposed between each two inter-engaging adjoining inner and outer peripheral faces, and heat conductive thin gaskets disposed between some of said opposite surfaces.

2. In a rotary pump unit, as claimed in claim 1, said motor having terminals, said top closure including a lid and a cap sealed thereto and defining therebetween a sealed space for said electric terminals.

References Cited by the Examiner
UNITED STATES PATENTS

| | | | |
|---|---|---|---|
| 2,191,050 | 2/1940 | Trice | 277—22 X |
| 2,320,708 | 6/1943 | Yost | 103—87 |
| 2,454,371 | 11/1948 | Berges | 230—211 X |
| 2,911,918 | 11/1959 | Reed | 103—87 |
| 3,153,382 | 10/1964 | Van Blarcon | 103—87 |

ROBERT M. WALKER, *Primary Examiner.*